(12) United States Patent
Maruyama et al.

(10) Patent No.: US 8,096,709 B2
(45) Date of Patent: Jan. 17, 2012

(54) SLIDING BEARING

(75) Inventors: Kazuo Maruyama, Matsudo (JP); Takeshi Yanase, Matsudo (JP); Kunio Maki, Matsudo (JP); Jun-ichi Kobayashi, Matsudo (JP); Osamu Mawatari, Matsudo (JP)

(73) Assignee: Hitachi Powdered Metals Co., Ltd., Matsudo-shi (JP)

( * ) Notice: Subject to any disclaimer, the term of this patent is extended or adjusted under 35 U.S.C. 154(b) by 727 days.

(21) Appl. No.: 12/224,656

(22) PCT Filed: Mar. 27, 2007

(86) PCT No.: PCT/JP2007/000309
§ 371 (c)(1),
(2), (4) Date: Sep. 3, 2008

(87) PCT Pub. No.: WO2007/122798
PCT Pub. Date: Nov. 1, 2007

(65) Prior Publication Data
US 2009/0067766 A1  Mar. 12, 2009

(30) Foreign Application Priority Data

Mar. 29, 2006  (JP) ................. 2006-091884

(51) Int. Cl.
*F16C 33/10*  (2006.01)
(52) U.S. Cl. .................................... 384/292
(58) Field of Classification Search .......... 384/279, 384/283, 286, 291, 292
See application file for complete search history.

(56) References Cited

U.S. PATENT DOCUMENTS

| 5,516,213 | A | * | 5/1996 | Moriyama et al. | 384/292 |
| 5,704,718 | A | * | 1/1998 | Mori et al. | 384/279 |
| 5,746,516 | A | * | 5/1998 | Miyasaka et al. | 384/291 |
| 6,082,904 | A | * | 7/2000 | Ono et al. | 384/291 |
| 6,398,416 | B1 | * | 6/2002 | Kurz et al. | 384/279 |
| 6,494,621 | B2 | * | 12/2002 | Markovitch | 384/292 |
| 2002/0112319 | A1 | | 8/2002 | Kida | |
| 2005/0286822 | A1 | | 12/2005 | Maruyama et al. | |

FOREIGN PATENT DOCUMENTS

| JP | A-2002-295457 | 10/2002 |
| JP | A-2002-323034 | 11/2002 |
| JP | A-2003-222133 | 8/2003 |
| JP | A-2006-009846 | 1/2006 |

* cited by examiner

Primary Examiner — Thomas R Hannon
(74) Attorney, Agent, or Firm — Oliff & Berridge, PLC (57) ABSTRACT

A sliding bearing comprises a shaft hole for rotatably supporting a shaft that is inserted thereinto, an inner circumferential surface on which the shaft slides, and plural linearly oblique grooves. The grooves extend in a direction crossing a circumferential direction of the sliding bearing and are formed on the inner circumferential surface at intervals, and the grooves are provided with a lubricant. The oblique grooves have an oblique angle in a range of 10° to 60° with respect to a direction perpendicular to the circumferential direction and have a width B in a range of 0.5 to 5 mm in the circumferential direction. The adjacent grooves have a land with a surface as a sliding surface therebetween, and the sliding surface has a width A in a range of 1 to 7 mm in the circumferential direction. A ratio A/B of the width A of the sliding surface of the land to the width B of the groove is in a range of 0.5 to 5.0.

9 Claims, 4 Drawing Sheets

SLIDING BEARING

TECHNICAL FIELD

The present invention relates to a sliding bearing, which may be suitably used as a bearing having large size, receiving high pressure on an inner circumferential surface as a bearing surface, and sliding at low speed by swinging movement toward a shaft, such as a bearing of a construction machine.

BACKGROUND ART

In general, in a joint portion of an arm provided in a construction machine such as a hydraulic excavator, a shaft is inserted into a bearing and repeatedly swings with respect to the bearing in a range of a predetermined turning angle. In this case, the bearing receives high surface pressure of at least 20 MPa. Therefore, as such a bearing, a sliding bearing made of a material with a superior wear resistance is used, and the sliding bearing is used being provided with a high-viscosity lubricant, grease, or wax on a sliding surface thereof. In such a sliding bearing, the sliding surface must be sufficiently supplied with a lubricant so that the sliding bearing smoothly operates without metal contact between the sliding bearing and the shaft and has wear resistance even when the sliding bearing receives a high surface pressure. Accordingly, a material such as a heat-treated carbon steel or a high-strength brass is used as a material for a sliding bearing. Recently, for example, a sintered material disclosed in Japanese Patent Application of Laid-Open No. 2003-222133 may be used as a material for a sliding bearing, and lubricants have been developed. Although the above material and the lubricants have superior characteristics, in order to further extend the life of a bearing, a sliding bearing disclosed in Japanese Patent Application of Laid-Open No. 2006-009846 is also used. In this sliding bearing, plural oblique grooves are formed on an inner circumferential surface so as to extend in a direction crossing the circumferential direction, whereby a lubricant held within the oblique grooves is supplied to a sliding surface as the shaft rotates.

According to the oblique grooves of the bearing disclosed in Japanese Patent Application of Laid-Open No. 2006-009846, the lubricant held within the oblique grooves is drawn by a drawing action generated by the rotation of the shaft. Then, the lubricant flows to the sliding surfaces of lands that are adjacent to the oblique grooves in the rotating direction of the shaft, thereby lubricating the sliding surfaces. In this case, the amount of the lubricant held is increased and is thereby sufficiently supplied to the sliding surfaces. However, there may be cases in which the lubricant is not sufficiently supplied to the sliding surfaces, and wear of the bearing may increase under certain conditions. The inventors have researched the reasons for this and have found the following facts. The lubricant is supplied from the oblique grooves to the sliding surfaces of lands that are adjacent to the oblique grooves, but the lubricant is not sufficient to lubricate the entire area of the sliding surfaces. Therefore, there are some portions in which the lubricant is insufficient, whereby metal contact occurs between the bearing and the shaft at these portions, and wear of the bearing increases.

DISCLOSURE OF THE INVENTION

An object of the present invention is to provide a sliding bearing that operates smoothly and has wear resistance for a long time. In the sliding bearing of the present invention, a lubricant is held within plural grooves that extend in a direction crossing the circumferential direction of the sliding bearing. The lubricant is sufficiently supplied to the entire area of sliding surfaces of lands that are adjacent to the grooves as a shaft rotates. Therefore, a lubricating effect is sufficiently obtained, and metal contact between the sliding bearing and the shaft can be inhibited even when the sliding bearing receives a high surface pressure.

The present invention provides a sliding bearing comprising a shaft hole for rotatably supporting a shaft that is inserted into the shaft hole, an inner circumferential surface on which the shaft slides, and plural linearly oblique grooves for being provided with a lubricant. The oblique grooves extend in a direction crossing a circumferential direction of the sliding bearing and are formed on the inner circumferential surface at intervals. The oblique grooves have an oblique angle in a range of 10° to 60° with respect to a direction perpendicular to the circumferential direction and have a width B in a range of 0.5 to 5 mm in the circumferential direction. The adjacent grooves have a land with a surface as a sliding surface therebetween, and the sliding surface has a width A in a range of 1 to 7 mm in the circumferential direction. A ratio A/B of the width A of the sliding surface of the land to the width B of the groove is in a range of 0.5 to 5.0.

In the above conditions relating to the oblique groove, the oblique angle of the oblique groove, the width of the oblique groove, and the width of the sliding surface are selected so that an imaginary line perpendicular to a sliding direction crosses the sliding surfaces and the oblique grooves at an optional position of the inner circumference of the bearing. In this case, when a load of a shaft is applied to an optional position of the inner circumference of the bearing, the surface of the shaft contacts with both the sliding surfaces and the grooves, and the lubricant is thereby continuously supplied to the sliding surfaces.

In the above conditions, the width B of the groove in the circumferential direction and the width A of the sliding surface in the circumferential direction are selected so as to satisfy the ratio A/B of the width A of the sliding surface to the width B of the groove. Therefore, even when the width of the groove of the present invention is smaller than the width of a conventional groove, the lubricant can be sufficiently supplied to the sliding surfaces. The lubricant is drawn from the grooves as the shaft rotates, and the lubricant flows to the sliding surfaces of the lands that are adjacent to the grooves. The amount of the lubricant sufficient to lubricate the entire area of the lands is held by the grooves, whereby a lubricating effect is sufficiently obtained. That is, these conditions are optimized so that the sliding surfaces are sufficiently lubricated by the effect of the oblique grooves formed on the inner circumferential surface.

The sliding bearing of the present invention is formed by improving a sliding bearing disclosed in Japanese Patent Application of Laid-Open No. 2003-222133. The width B of the groove in the circumferential direction, the width A of the sliding surface in the circumferential direction, and the ratio A/B of the width A of the sliding surface to the width B of the groove are appropriately set so that the lubricant can be sufficiently supplied to the entire area of the sliding surfaces. The width A of the sliding surface in the circumferential direction and the ratio A/B of the width A of the sliding surface to the width B of the groove are optimized. Therefore, in the sliding bearing of the present invention, the width B of the groove in the circumferential direction can be smaller, and the oblique angle of the oblique groove can be greater than those of the sliding bearing disclosed in Japanese Patent Application of Laid-Open No. 2006-009846. Accordingly, the sliding surfaces may receive surface pressure that is reduced. It should be noted that the width B of the groove and the width A of the sliding surface of the present invention are the widths in the circumferential direction, and are not the widths in a direction perpendicular to the extending direction of the groove.

According to the present invention, in the grooves for holding the lubricant formed on the inner circumferential surface of the bearing, the oblique angle with respect to the direction perpendicular to the circumferential direction is optimized. In addition, the width B of the groove in the circumferential direction and the width A of the sliding surface between the grooves in the circumferential direction are optimized. Moreover, the ratio A/B of the width A of the sliding surface to the width B of the groove in the circumferential direction and an area ratio of the grooves to the inner circumferential surface are optimized. These conditions are optimized so that the lubricant is sufficiently supplied from the grooves to the entire area of the sliding surfaces. Therefore, the lubricating effect is sufficiently obtained, whereby the bearing smoothly operates without metal contact between the sliding bearing and the shaft and having wear resistance even when the sliding bearing receives a high surface pressure.

BRIEF DESCRIPTION OF THE DRAWINGS

FIG. 4 shows experimental results of embodiments for investigating an effect of width A of a sliding surface, and FIG. 4 is a diagram showing a relationship between the width A and a static or dynamic friction coefficient.

FIG. 5 shows experimental results of embodiments for investigating an effect of width B of a groove, and FIG. 5 is a diagram showing a relationship between the width B and a static or dynamic friction coefficient.

FIG. 6 shows experimental results of embodiments for investigating an effect of a ratio (A/B) of the width A of the sliding surface to the width B of the groove when there were 72 grooves. FIG. 6 is a diagram showing an example of a relationship between the A/B and a static or dynamic friction coefficient.

FIG. 7 shows experimental results of embodiments for investigating the effect of the ratio (A/B) of the width A of the sliding surface to the width B of the groove when there were 36 grooves. FIG. 7 is a diagram showing an example of a relationship between the A/B and a static or dynamic friction coefficient.

FIG. 8 shows experimental results of embodiments for investigating an effect of depth "d" of a groove, and FIG. 8 is a diagram showing a relationship between the depth "d" of the groove and a static or dynamic friction coefficient.

FIG. 9 shows experimental results of embodiments for investigating an effect of oblique angle of an oblique groove, and FIG. 9 is a diagram showing a relationship between the oblique angle and a static or dynamic friction coefficient.

EXPLANATION OF REFERENCE SYMBOLS

The letter A denotes a width of a sliding surface in a circumferential direction, B denotes a width of a groove in a circumferential direction, R denotes a circumferential direction, and S denotes a direction perpendicular to the circumferential direction R; the reference numeral 10 denotes an inner circumferential surface, 11 denotes a shaft hole, 12 denotes grooves, 13 denotes lands, 14 denotes sliding surfaces, and 20 denotes a shaft.

BEST MODE FOR CARRYING OUT THE INVENTION

Hereinafter, an embodiment of the present invention will be described with reference to the figures.

Figure 1:
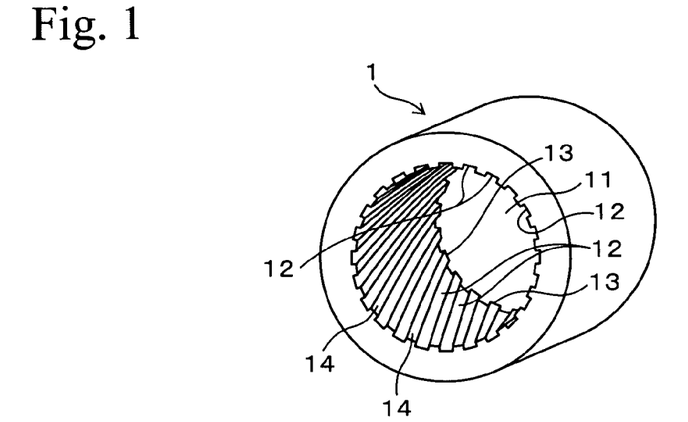
FIG. 1 shows a perspective view of a bearing of an embodiment of the present invention.
Figure 2:
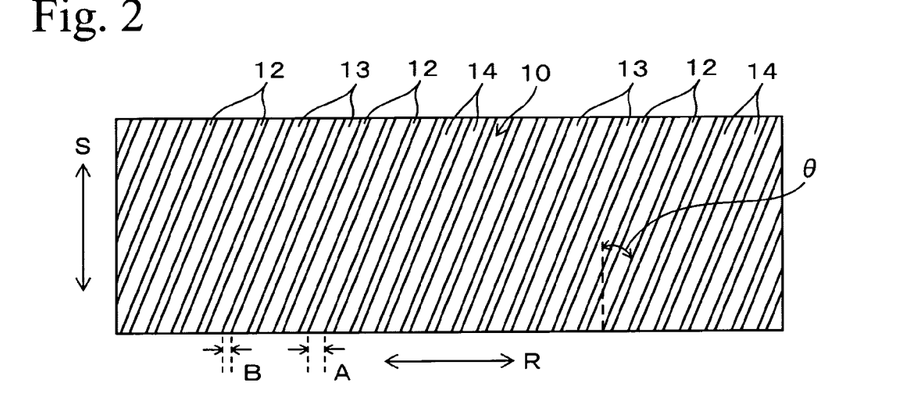
FIG. 2 is a development view showing an inner circumferential surface of the bearing shown in FIG. 1.
Figure 3:
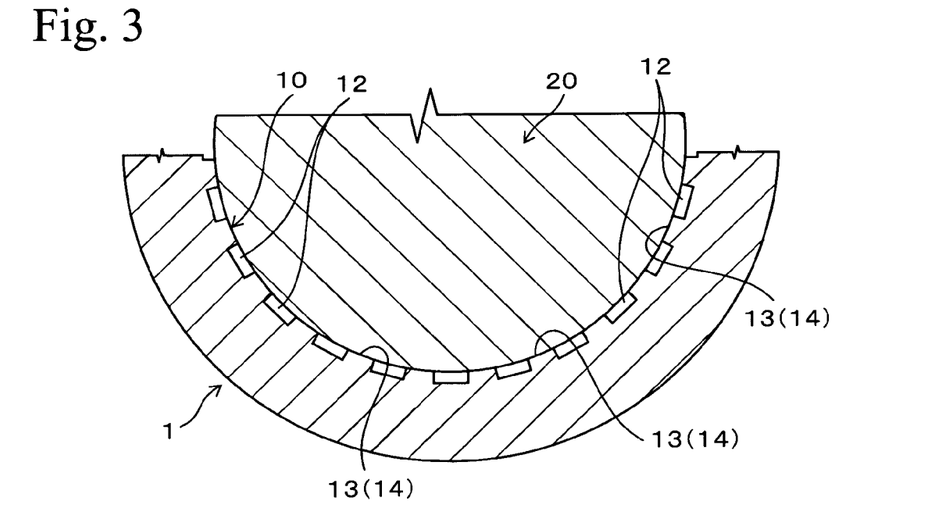
FIG. 3 shows a sectional view of the bearing into which a shaft is inserted.

FIG. 1 shows a sliding bearing 1 of an embodiment, FIG. 2 shows a development view of an inner circumferential surface 10 of the bearing 1, and FIG. 3 is a sectional view showing a condition in which a shaft 20 is rotatably inserted into a shaft hole 11 of the bearing 1. Plural linearly oblique grooves 12 are formed at equal intervals on the inner circumferential surface 10 of the bearing 1 in a circumferential direction. The oblique grooves 12 extend in a direction crossing a sliding direction of the shaft 20, that is, the circumferential direction (the direction indicated by an arrow R in FIG. 2). The shaft 20 swings on the sliding surfaces 14, which are the surfaces of lands 13 between the oblique grooves 12. In the sliding bearing, the inner circumferential surface 10 has a diameter of approximately 20 to 150 mm, and the length in the axial direction is approximately 20 to 150 mm. The sliding bearing may be used for swinging movement in which a maximum swinging rate reaches a range of 20 to 50 mm/s under a high surface pressure of 20 MPa or more. When the sliding bearing is used for such swinging movement, the sliding bearing is stopped at each end of a swinging angle and is operated by switching the direction of movement. That is, the sliding bearing is operated by repeating the static state and the sliding state. Therefore, decreasing a dynamic friction coefficient and a static friction coefficient is required in this kind of sliding bearing. Specifically, since the static friction coefficient is larger than the dynamic friction coefficient, it is important to decrease the static friction coefficient in order to prevent metal contact between the sliding bearing and the shaft.

The sliding bearing of the present invention is formed by improving the sliding bearing disclosed in Japanese Patent Application of Laid-Open No. 2006-009846. The sliding bearing of the present invention is similar to the sliding bearing disclosed in Japanese Patent Application of Laid-Open No. 2006-009846, and a lubricant is held within the oblique grooves 12 provided on the inner circumference of the sliding bearing. The lubricant is drawn by a drawing action generated by the rotation of the shaft. Then, the lubricant flows to the sliding surfaces of the lands that are adjacent to the oblique grooves in the rotating direction of the shaft, thereby lubricating the sliding surfaces.

The oblique angle of the oblique grooves 12, the width of the oblique grooves 12, and the width of the sliding surface 14 are selected so that an imaginary line perpendicular to a sliding direction crosses the sliding surfaces 14 and the oblique grooves 12 at an optional position of the inner circumference of the bearing. In this case, when a load of a shaft is applied to an optional position of the inner circumference of the bearing, the surface of the shaft contacts with both the sliding surfaces and the grooves, and the lubricant is continuously supplied to the sliding surfaces 14. Moreover, when foreign matter enters into the bearing from the outside of the components of the bearing, the oblique grooves 12 act as spaces to receive the foreign matter, and the oblique grooves 12 prevent the foreign matter from entering the sliding surfaces and prevent wear of the sliding surfaces due to the foreign matter.

In the oblique grooves having the above effects, if the distance between the oblique grooves, that is, the width of the sliding surface 14, is large, the sliding surfaces may receive a surface pressure that is reduced. On the other hand, if the width of the sliding surface 14 is too large, the lubricant may not be sufficiently supplied to the entire area of the sliding surfaces 14. If the width of the sliding surface 14 is small, the lubricant is readily supplied to the sliding surfaces 14. In this case, since the area of the sliding surfaces that receive the load of the shaft is decreased, the sliding surfaces may receive a surface pressure that is increased, and metal contact between the sliding bearing and the shaft may readily occur. The inventors have researched on the effects of the width of the sliding surface 14 from these points of view and have found the following fact. When the surface of the land between the adjacent grooves 12 (width A of the sliding surface) has a width in a range of 1 to 7 mm in the circumferential direction, the lubricant is sufficiently supplied to the entire area of the sliding surfaces without greatly increasing the surface pressure that is applied to the sliding surfaces. Accordingly, in the sliding bearing of the present invention, the width A of the sliding surface is selected from a range of 1 to 7 mm.

If the width of the oblique groove 12 is too small, the amount of the lubricant held within the oblique grooves 12 is decreased, and the lubricant is not sufficiently supplied to the sliding surfaces 14. On the other hand, if the width of the oblique groove 12 is too large, the lubricant may easily leak. Moreover, since the area of the sliding surfaces that receive the load of the shaft is decreased, the sliding surfaces may receive a surface pressure that is increased. As a result, metal contact between the sliding bearing and the shaft may easily occur, and the dynamic friction coefficient may be increased. The inventors have researched on the effects of the width of the oblique groove 12 from these points of view and have found the following fact. In a condition in which the width A of the sliding surface is selected from the above range, the width of the oblique groove 12 in the circumferential direction (width B of the groove) is set to be in a range of 0.5 to 5 mm. Although the width B of the groove may be smaller than that in Japanese Patent Application of Laid-Open No. 2006-009846, the lubricant can be sufficiently supplied to the sliding surfaces 14, and the dynamic friction coefficient can be decreased. Therefore, in the sliding bearing of the present invention, the width B of the groove is selected from a range of 0.5 to 5 mm. In the sliding bearing of the present invention, even when the width B of the groove is smaller than that in Japanese Patent Application of Laid-Open No. 2006-009846 as described above, the sliding surface may receive a surface pressure that is lower than that disclosed in this patent document. As a result, the lubricant is effectively and sufficiently supplied to the entire area of the sliding surfaces.

The above width of the oblique groove 12 is closely related to the width of the sliding surface 14 with regard to the lubricant being sufficiently supplied to the entire area of the sliding surfaces. If the width of the oblique groove 12 is set to be large within the above range, the amount of the lubricant held therein is increased, whereby the amount of the lubricant to be supplied to the sliding surfaces can be increased. In this case, the width of the sliding surface 14 can be enlarged so as to reduce the surface pressure that will be applied to the sliding surfaces 14. On the other hand, if the width of the oblique groove 12 is small, the lubricant held therein is decreased, whereby the amount of the lubricant to be supplied to the sliding surfaces is decreased. In this case, the width of the sliding surface 14 must be small. Therefore, in order to sufficiently lubricate the sliding surfaces, a ratio of the width of the sliding surface 14 to the width of the oblique groove 12 must be appropriately selected. From this point of view, in the sliding bearing of the present invention, not only are the width A of the sliding surface and the width B of the groove set as described above, but the ratio A/B thereof is also set in a range of 0.5 to 5.0. When the ratio A/B of the width A of the sliding surface to the width B of the groove is in this range, the sliding surface 14 may receive a surface pressure that is not too large, and the entire area of the sliding surfaces is sufficiently lubricated. As a result, the dynamic friction coefficient can be decreased, and the sliding bearing will smoothly operate and have wear resistance for a long time. On the other hand, when the ratio A/B of the width A of the sliding surface to the width B of the groove is less than 0.5, the width A of the sliding surface is too small with respect to the width B of the groove. In this case, the sliding surface may receive surface pressure that is very large, whereby metal contact between the sliding bearing and the shaft tends to occur. Moreover, there may be cases in which deformation such as buckling occurs. When the ratio A/B is greater than 5.0, the width A of the sliding surface is too large with respect to the width B of the groove, whereby the entire area of the sliding surfaces is not sufficiently lubricated. As a result, metal contact between the sliding bearing and the shaft tends to occur, and wear may occur.

In the sliding bearing of the present invention, the width B of the groove, the width A of the sliding surface, and the ratio A/B thereof are optimized as described above. Therefore, the sliding surface receives a surface pressure that is not very large, and the lubricant is sufficiently supplied to the entire area of the sliding surfaces. Accordingly, the metal contact between the sliding bearing and the shaft can be avoided, and the dynamic friction coefficient can be decreased, whereby the bearing smoothly operates and has wear resistance for a long time. Since the lubricant is sufficiently supplied to the entire area of the sliding surfaces, an oil film of the lubricant is held between the shaft and the sliding surface of the sliding bearing during the start of operation and static states at both ends of the swinging angle. Therefore, the static friction coefficient is reduced, and the metal contact between the sliding bearing and the shaft can be avoided when the sliding bearing starts to move.

The width of the oblique groove 12, the width of the sliding surface 14, and the ratio thereof are selected as described above. If an oblique angle of the oblique groove is too small, facing portions of the shaft, which face the inner circumferential surface of the bearing, slide over less oblique grooves 12 and sliding surfaces 14, and the lengths of the grooves 12 and the sliding surfaces 14 are large with respect to the facing portions. Therefore, the facing portions are not uniformly lubricated. If the oblique angle of the oblique groove is greater than a certain degree, the facing portions slide over more oblique grooves 12 and sliding surfaces 14, and the lengths of the oblique groove 12 and the sliding surface 14 are appropriate with respect to the facing portions. Therefore, the entire area of the sliding surfaces is sufficiently lubricated. On the other hand, if the oblique angle of the oblique groove is too large, the facing portions slide over much more oblique grooves 12 and sliding surfaces 14, and the lubricant flows along the oblique grooves 12, whereby the lubricant is not sufficiently supplied to the sliding surfaces. From these points of view, it is appropriate that the oblique angle of the oblique groove be selected from a range of 10° to 60°, and preferably, from a range of approximately 15° to 50°. Furthermore, the oblique angle of the oblique groove is preferably selected from a range of approximately 20° to 40° in which the friction coefficients are small and approximately constant. That is, in the present invention, the width of the oblique groove 12, the width of the sliding surface 14, and the ratio thereof are optimized, whereby the oblique angle of the oblique groove 12 can be selected from a wider range compared to that in Japanese Patent Application of Laid-Open No. 2006-009846. As a result, the sliding bearing can be designed more freely.

The distance between the grooves may be formed as equal intervals, as shown in FIGS. 1 to 3, or may be formed as unequal intervals as long as the width B of the groove, the width A of the sliding surface, and the ratio A/B thereof are formed as described above. If the depth "d" of the oblique groove 12 is small, the amount of the lubricant held therein is too small to be supplied to the entire area of the sliding surfaces. Therefore, the depth "d" of the oblique groove 12 must be not less than 0.1 mm. On the other hand, if the depth "d" of the oblique groove 12 is too large, the height of the sliding surface 14 with respect to the bottom of the oblique groove 12 is large, whereby the sliding surfaces may buckle during operation under a high surface pressure and swinging movement. Therefore, the depth "d" of the oblique groove 12 must be not more than 3 mm.

The oblique groove 12 has a rectangular shape in cross section, as shown in the figures, and may have an optional shape such as a circular arc shape and a U-shape. The oblique groove 12 is preferably formed in a V-shape or a trapezoidal shape having an upper surface that is larger than a lower surface so that the lubricant is easily supplied to the sliding surfaces during swinging movement of the shaft. A corner portion between the bottom of the oblique groove 12 and the land 13 is preferably cut off so as to improve the flow of the lubricant and to reduce the friction. Specifically, when the oblique groove 12 has a circular arc shape or a U-shape in cross section, the corner portion is preferably cut off.

Machine oil, grease, or a mixture of wax and oil, can be used as the lubricant, which is the same as the case of a conventional sliding bearing. Moreover, since the oblique angle, the width B of the groove, the width A of the sliding surface, and the ratio A/B thereof are set so that the oblique groove 12 is formed within the above range, a lubricant can be selected from a wider viscosity range compared to that of a lubricant conventionally used. A sliding bearing having a simple cylindrical shape without an oblique groove is used in Japanese Patent Application of Laid-Open No. 2003-222133. In this case, machine oil having a kinetic viscosity of from 414 to 1100 $mm^2/s$ at 40° C. or more (corresponding to ISO VG 460 to 1000 of the viscosity grade of ISO) may be used. On the other hand, in the sliding bearing of the present invention in which oblique grooves are formed within the above range, a lubricant having a kinetic viscosity of 1650 $mm^2/s$ at 40° C. (corresponding to ISO VG 1500) can be used. In the sliding bearing of the present invention, the oblique angle of the oblique groove 12, the width B of the groove, the width A of the sliding surface, and the ratio A/B thereof are set within the above range. Therefore, even when a lubricant has a high viscosity and does not easily flow, the lubricant is readily sufficiently supplied to the sliding surfaces 14. Such a lubricant with a high viscosity does not easily flow, whereby an oil film can be reliably formed. Accordingly, in the sliding bearing of the present invention, a lubricant with a high viscosity may be used to prevent metal contact between the sliding bearing and the shaft so that wear can be avoided, and so that the life of the bearing may be extended. In a sliding bearing having a simple cylindrical shape without an oblique groove, only grease having a mixing consistency of approximately 205 to 265 (consistency No. 2 to 4 defined in Japanese Industrial Standard JIS K2220) can be used. On the other hand, in the sliding bearing of the present invention, grease having a mixing consistency of approximately 130 (consistency No. 5 defined in JIS K2220) can also be used.

The kind of material for the bearing 1 is not limited, and a heat-treated carbon steel or an ingot material such as a high-strength brass may be used. In this case, the oblique groove 12 may be formed by casting, extrusion processing, or machining. Moreover, a sintered material may be used as a material for the bearing 1. The sintered material is obtained by sintering a compact that is provided by filling a raw powder into a die assembly and then compacting by punches from upper and lower directions. The sintered material is preferably used because the oblique groove 12 can be easily formed thereat by providing the shape of the oblique groove 12 on a core rod. Moreover, the sintered material has a wide range of variations in compositions compared to a case of an ingot material, and a metallic structure that cannot be provided in an ingot material is easily provided to the sintered material, and therefore the sintered material is preferably used.

A sintered material to be preferably used for the bearing 1 is the same as materials recited in Japanese Patent Application of Laid-Open No. 2006-009846, and any of the following materials may be used.
(A) A sintered alloy in which at least one of copper particles and copper alloy particles are dispersed in a base of an iron alloy with a metallic structure including martensite, and in which the content of Cu is in a range of 7 to 30 mass %.
(B) A sintered alloy in which one of iron-base alloy particles or cobalt-base alloy particles that are harder than the base of the iron alloy are dispersed in the sintered alloy (A) in a range of 5 to 30 mass %.
(C) A sintered material in which at least one of carbon particles and molybdenum disulfide particles are included in the sintered alloy (A) or (B) at not more than 3 mass %.

According to the bearing 1 of the embodiment, when the shaft 20 rotates, a lubricant held within the oblique grooves 12 is drawn and flows in the rotating direction of the shaft 20. Then, the lubricant is supplied to the sliding surfaces 14 of the lands 13, whereby the bearing 1 is lubricated and smoothly slides with respect to the shaft 20. The oblique groove 12 is formed so as to satisfy each of the above-described conditions of the oblique angle, the width B of the groove, the width A of the sliding surface, and the ratio A/B thereof. Therefore, it is ensured that the amount of the lubricant flowing from the oblique grooves 12 to the sliding surfaces 14 is sufficiently supplied to the entire area of the lands 13. The lubricant supplied to the entire area of the lands 13 in this way is held during a static state. Accordingly, the lubricating effect is sufficiently obtained, and the dynamic friction coefficient and the static friction coefficient can be decreased. As a result, the lubricating effect can be maintained for a long time even when the bearing is subjected to a high surface pressure, and a bearing which is not easily worn and has high durability is thereby obtained.

EMBODIMENTS

Embodiments will be described to illustrate the effects of the present invention.

First Embodiment

An amount of 18 mass % of an atomized copper powder and an amount of 0.8 mass % of a carbon powder were added to an atomized iron powder so as to obtain a raw powder. An amount of 0.5 mass parts of a zinc stearate powder as a forming lubricant was added to 100 mass parts of the raw powder, and a mixed powder was obtained. Then, the mixed powder was compacted so as to have a cylindrical shape with an outer diameter of 95 mm, an inner diameter of 80 mm, and a height (shaft length) of 80 mm. After the compact was sintered at 1120° C. in a reducing gas and was heated to 850° C., the compact was oil quenched and was tempered at 180° C., whereby samples of bearing were formed.

The above bearings were formed with grooves having a rectangular shape in cross section on inner circumferential surfaces by machining. Number, width, and depth of the grooves formed are shown in Table 1, and an oblique angle of the grooves with respect to a direction perpendicular to the circumferential direction (sliding direction) was 20°. Then, these bearings were vacuum-impregnated with machine oil, which had a kinetic viscosity of 460 mm$^2$/s at 40° C., and bearings (sample Nos. 01 to 40) were formed under conditions shown in Table 1. Table 1 shows the number of grooves, width A of a sliding surface of a land, width B of a groove, ratio of the width A of the sliding surface to the width B of the groove, and depth of the groove. It should be noted that each of the width A of the sliding surface and the width B of the groove was defined as the width in the circumferential direction and was not the width in the direction perpendicular to the groove.

Each of the bearings of the sample Nos. 01 to 40 was fixed to a housing. The inner circumferential surfaces of the bearings, and the surfaces of shafts which were made of steel and were quenched and polished, were coated with grease having a mixing consistency of 280 (lithium grease No. 2). The shaft was inserted into a shaft hole of each bearing. The clearance between the inner circumferential surface of the sample of the bearing and the shaft was approximately 300 μm. Then, the shaft was swung at 0.5 mm/min at an angle in a range of 0° to 10° while a load of 650N was applied thereto in a radial direction. The swinging movement was temporary stopped at both end positions of pendulum motion for 0.5 seconds. Torque was measured by a torque sensor at that time, and values (average values) of static friction coefficient and dynamic friction coefficient calculated from the torque are shown in Table 1.

TABLE 1

| Sample No. | Number of grooves | Width A of sliding surface mm | Width B of groove mm | A/B | Depth of groove mm | Static friction coefficient | Dynamic friction coefficient | notes |
|---|---|---|---|---|---|---|---|---|
| 01 | 300 | 0.50 | 0.34 | 1.48 | 0.70 | 0.15 | 0.12 | deformed |
| 02 | 150 | 1.00 | 0.68 | 1.48 | 0.70 | 0.12 | 0.10 | |
| 03 | 75 | 2.00 | 1.35 | 1.48 | 0.70 | 0.11 | 0.10 | |
| 04 | 50 | 3.00 | 2.03 | 1.48 | 0.70 | 0.11 | 0.10 | |
| 05 | 30 | 5.00 | 3.38 | 1.48 | 0.70 | 0.12 | 0.10 | |
| 06 | 21 | 7.00 | 4.97 | 1.41 | 0.70 | 0.14 | 0.12 | |
| 07 | 18 | 8.30 | 5.66 | 1.47 | 0.70 | 0.21 | 0.15 | |
| 08 | 180 | 1.00 | 0.40 | 2.52 | 0.70 | 0.18 | 0.14 | |
| 09 | 141 | 1.28 | 0.50 | 2.55 | 0.70 | 0.13 | 0.12 | |
| 10 | 100 | 1.80 | 0.71 | 2.52 | 0.70 | 0.12 | 0.11 | |
| 11 | 60 | 3.00 | 1.19 | 2.52 | 0.70 | 0.11 | 0.10 | |
| 12 | 38 | 4.74 | 1.87 | 2.53 | 0.70 | 0.11 | 0.10 | |
| 13 | 34 | 4.30 | 3.09 | 1.39 | 0.70 | 0.12 | 0.10 | |
| 14 | 31 | 4.71 | 3.40 | 1.39 | 0.70 | 0.12 | 0.10 | |
| 15 | 27 | 5.41 | 3.90 | 1.39 | 0.70 | 0.12 | 0.10 | |
| 16 | 21 | 6.97 | 5.00 | 1.39 | 0.70 | 0.13 | 0.12 | |
| 17 | 19 | 7.69 | 5.54 | 1.39 | 0.70 | 0.20 | 0.15 | |
| 18 | 72 | 1.00 | 2.49 | 0.40 | 0.70 | 0.18 | 0.14 | |
| 19 | 72 | 1.16 | 2.33 | 0.50 | 0.70 | 0.13 | 0.12 | |
| 20 | 72 | 1.75 | 1.74 | 1.01 | 0.70 | 0.12 | 0.11 | |
| 21 | 72 | 2.07 | 1.42 | 1.46 | 0.70 | 0.11 | 0.10 | |
| 22 | 72 | 2.49 | 1.00 | 2.49 | 0.70 | 0.11 | 0.10 | |
| 23 | 72 | 2.80 | 0.69 | 4.05 | 0.70 | 0.11 | 0.10 | |
| 24 | 72 | 2.91 | 0.58 | 5.01 | 0.70 | 0.13 | 0.11 | |
| 25 | 72 | 3.00 | 0.49 | 6.11 | 0.70 | 0.21 | 0.16 | |
| 26 | 36 | 2.00 | 4.98 | 0.40 | 0.70 | 0.19 | 0.15 | |
| 27 | 36 | 2.32 | 4.66 | 0.50 | 0.70 | 0.13 | 0.12 | |
| 28 | 36 | 3.49 | 3.49 | 1.00 | 0.70 | 0.12 | 0.11 | |
| 29 | 36 | 4.66 | 2.32 | 2.01 | 0.70 | 0.11 | 0.10 | |
| 30 | 36 | 5.25 | 1.73 | 3.03 | 0.70 | 0.11 | 0.10 | |
| 31 | 36 | 5.60 | 1.38 | 4.05 | 0.70 | 0.11 | 0.10 | |
| 32 | 36 | 5.82 | 1.16 | 5.01 | 0.70 | 0.13 | 0.12 | |
| 33 | 36 | 6.00 | 0.98 | 6.11 | 0.70 | 0.20 | 0.15 | |
| 34 | 72 | 2.07 | 1.42 | 1.46 | 0.05 | 0.21 | 0.16 | |
| 20 | 72 | 1.75 | 1.74 | 1.01 | 0.70 | 0.12 | 0.11 | |
| 35 | 72 | 2.07 | 1.42 | 1.46 | 0.10 | 0.14 | 0.13 | |
| 36 | 72 | 2.07 | 1.42 | 1.46 | 0.50 | 0.12 | 0.11 | |
| 37 | 72 | 2.07 | 1.42 | 1.46 | 1.00 | 0.12 | 0.11 | |
| 38 | 72 | 2.07 | 1.42 | 1.46 | 2.00 | 0.11 | 0.10 | |
| 39 | 72 | 2.07 | 1.42 | 1.46 | 3.00 | 0.11 | 0.10 | |
| 40 | 72 | 2.07 | 1.42 | 1.46 | 3.50 | 0.11 | 0.10 | deformed |

Evaluations regarding the results of the test will be described hereinafter.

Figure 4:
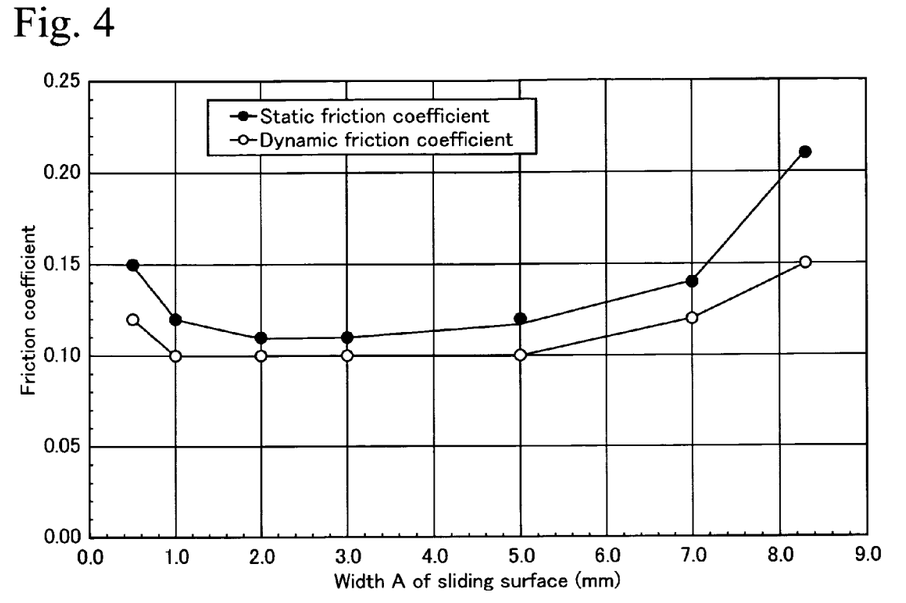

(1) Effect of the Width A of the Sliding Surface (See FIG. 4)

In the bearings of the samples Nos. 01 to 07 shown in Table 1, the ratios (A/B) of the width A of the sliding surface to the width B of the groove were similar, and the widths A of the sliding surface were different from each other so as to investigate the effect thereof. In the bearing of the sample No. 01 having the width A of the sliding surface of less than 1 mm, the width A of the sliding surface was too small to bear the load, and the lands were deformed by buckling. As a result, the lubricant was not sufficiently supplied to the sliding surfaces because the width B of the groove was decreased, whereby the static friction coefficient and the dynamic friction coefficient were large. On the other hand, in the bearing of the sample No. 02 having the width A of the sliding surface of 1 mm, the sliding surfaces could bear the load, and the lands were not deformed. In this case, the lubricant was sufficiently supplied from the grooves to the sliding surfaces because the width A of the sliding surface was small, whereby the static friction coefficient and the dynamic friction coefficient were small. Although the static friction coefficient and the dynamic friction coefficient were slightly increased as the width A of the sliding surface increased, the static friction coefficients and the dynamic friction coefficients were sufficiently small until the width A of the sliding surface was 7 mm (sample No. 06). In the bearing of the sample No. 07 having the width A of the sliding surface of more than 7 mm, the width A of the sliding surface was large, whereby the lubricant was not sufficiently supplied from the groove to the sliding surfaces, and the static friction coefficient and the dynamic friction coefficient were greatly increased. Accordingly, it is appropriate that the width A of the sliding surface be selected from a range of 1 to 7 mm.

Figure 5:
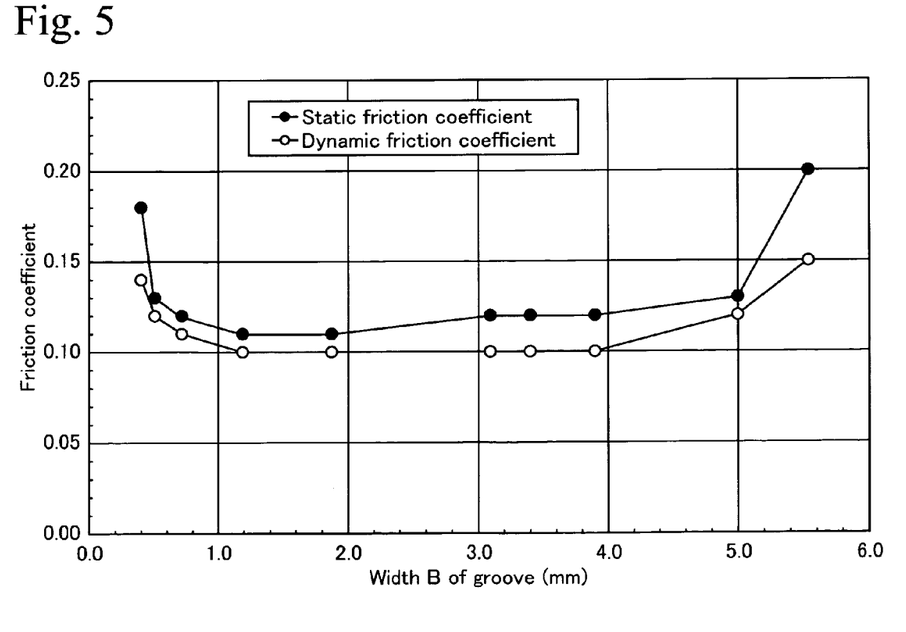

(2) Effect of the Width B of the Groove (See FIG. 5)

In the bearings of the samples Nos. 08 to 17 shown in Table 1, each group of the bearings of the samples Nos. 08 to 12 and the bearings of the samples Nos. 13 to 17 had approximately the same ratio (A/B) of the width A of the sliding surface to the width B of the groove. In the bearings of the samples Nos. 08 to 17, the widths B of the groove were set to be different from each other so as to investigate the effects thereof. In the bearing of the sample No. 08 having the width B of the groove of less than 0.5 mm, although the width A of the sliding surface was sufficiently large, the lubricant was not sufficiently supplied to the sliding surfaces, whereby the friction coefficients were large. On the other hand, in the bearing of the sample No. 09 having the width B of the groove of 0.5 mm, the width B of the groove was sufficiently large, whereby the lubricant was sufficiently supplied to the sliding surfaces, and the static friction coefficient and the dynamic friction coefficient were greatly decreased. When the width B of the groove was in a range of 0.5 to 5 mm, the static friction coefficients and the dynamic friction coefficients were small and were approximately constant. In the bearing of the sample No. 17 having the width B of the groove of more than 5 mm, since the ratio (A/B) of the width A of the sliding surface to the width B of the groove was fixed, the width A of the sliding surface was large. As a result, the lubricant was not sufficiently supplied to the sliding surfaces, whereby the static friction coefficient and the dynamic friction coefficient were greatly increased. Accordingly, it is appropriate that the width B of the groove be selected from a range of 0.5 to 5 mm.

Figure 6:
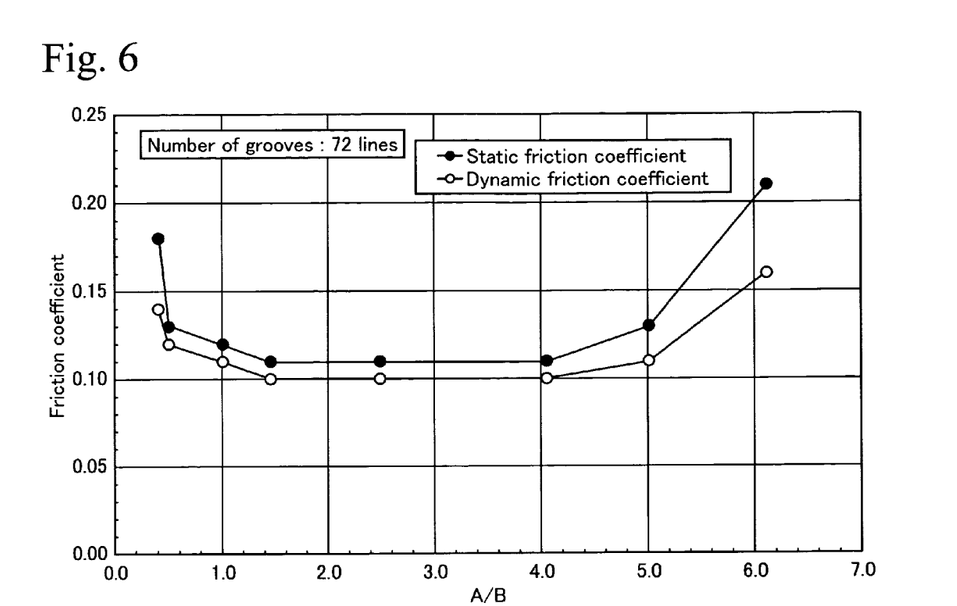
Figure 7:
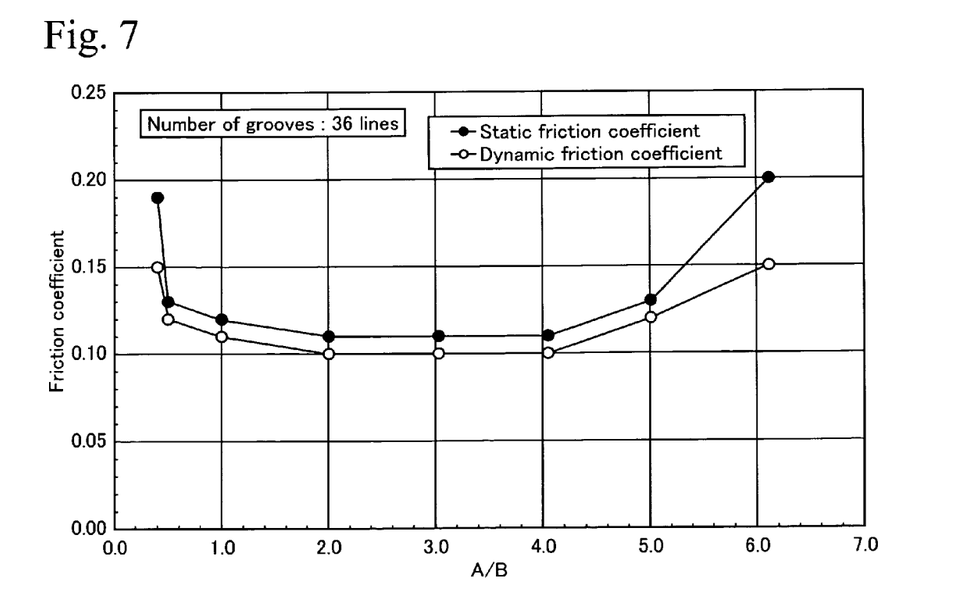

(3) Effect of the Ratio (A/B) of the Width A of the Sliding Surface to the Width B of the Groove (See FIGS. 6 and 7)

The bearings of the samples Nos. 18 to 25 shown in Table 1 had the same number of grooves, which was 72, and the bearings of the samples Nos. 26 to 33 shown in Table 1 had the same number of grooves, which was 36. In the bearings of the samples Nos. 18 to 33, the width A of the sliding surface and the width B of the groove were varied so as to investigate the effects of the ratio (A/B) thereof. The results for the samples Nos. 18 to 25 having 72 grooves are shown in FIG. 6, and the results for the samples Nos. 26 to 33 having 36 grooves are shown in FIG. 7. In the bearings of the samples Nos. 18 and 26 having the ratio A/B of less than 0.5, the widths A of the sliding surface were large with respect to the widths B of the groove. As a result, the lubricant was not sufficiently supplied to the sliding surfaces, whereby the static friction coefficients and the dynamic friction coefficients were large. On the other hand, in the bearings of the samples Nos. 19 to 24 having 72 grooves and the samples Nos. 27 to 32 having 36 grooves, in which the ratios A/B were in a range of 0.5 to 5, the lubricant was sufficiently supplied to the sliding surfaces. As a result, the static friction coefficients and the dynamic friction coefficients were small and were approximately constant. In the bearings of the samples Nos. 25 and 33 having the ratio A/B of more than 5, the widths A of the sliding surface were large with respect to the widths B of the groove. As a result, the lubricant was not sufficiently supplied to the sliding surfaces, whereby the static friction coefficients and the dynamic friction coefficients were greatly increased. Accordingly, the ratio A/B must be selected from a range of 0.5 to 5.

(4) Effect of the Depth "d" of the Groove (See FIG. 7)

The bearings of the samples Nos. 20 and 34 to 40 shown in Table 1 were used to investigate the effects of the depth of the groove. In the bearing of the sample No. 34 having a depth of the groove of less than 0.1 mm, the depth of the groove was very small, whereby sufficient lubricant was not held within the grooves. Therefore, the lubricant was not sufficiently supplied to the sliding surfaces, and the static friction coefficient and the dynamic friction coefficient were thereby large. On the other hand, in the bearing of the sample No. 35 having a depth of the groove of 0.1 mm, the depth of the grooves was great enough to sufficiently hold the lubricant. As a result, the lubricant was sufficiently supplied to the sliding surfaces, and the static friction coefficient and the dynamic friction coefficient were greatly decreased. When the depth of the groove was in a range of 0.1 to 3 mm, the static friction coefficients and the dynamic friction coefficients were small and were approximately constant. In the bearing of the sample No. 40 having the depth of the groove of more than 3 mm, since the depth of the groove was very large, the sliding surfaces could not bear the load and were deformed. Accordingly, it is appropriate that the depth of the groove be selected from a range of 0.1 to 3 mm.

Second Embodiment

The same raw powder as in the first embodiment was used, and the mixed powder was formed and sintered in the same way as in the first embodiment, whereby samples of bearing were formed. The bearings were formed with grooves having a rectangular shape in cross section on inner circumferential surfaces by machining. In the bearings, the number of the grooves was 72, the width A of the sliding surface was 2.07 mm, the width B of the grooves was 1.42 mm, and the depth of the grooves was 0.7 mm. The bearings had an oblique angle with respect to a direction perpendicular to the circumferential direction (sliding direction), which was varied as shown in Table 2. Then, the bearings were vacuum-impregnated with machine oil in the same way as the first embodiment, and bearings (samples Nos. 41 to 53) having an oblique angle of the oblique groove shown in Table 2 were formed. The bearings of the samples Nos. 41 to 53 were tested by swinging in the same way as in the first embodiment, and static friction coefficients and dynamic friction coefficients obtained by the test are shown in Table 2. The friction coefficients of the bearing of the sample No. 21 in the first embodiment is also shown in Table 2, as an example of a bearing in which the oblique angle of the oblique groove was 20°.

TABLE 2

| Sample No. | Oblique angle | Static friction coefficient | Dynamic friction coefficient |
| --- | --- | --- | --- |
| 41 | 0 | 0.19 | 0.13 |
| 42 | 5 | 0.16 | 0.12 |
| 43 | 10 | 0.13 | 0.11 |
| 44 | 15 | 0.12 | 0.11 |
| 21 | 20 | 0.11 | 0.10 |
| 45 | 25 | 0.11 | 0.10 |
| 46 | 30 | 0.11 | 0.10 |
| 47 | 35 | 0.11 | 0.10 |
| 48 | 40 | 0.11 | 0.10 |
| 49 | 50 | 0.12 | 0.10 |
| 50 | 60 | 0.13 | 0.10 |
| 51 | 70 | 0.14 | 0.11 |
| 52 | 80 | 0.15 | 0.11 |
| 53 | 90 | 0.16 | 0.12 |

Figure 8:
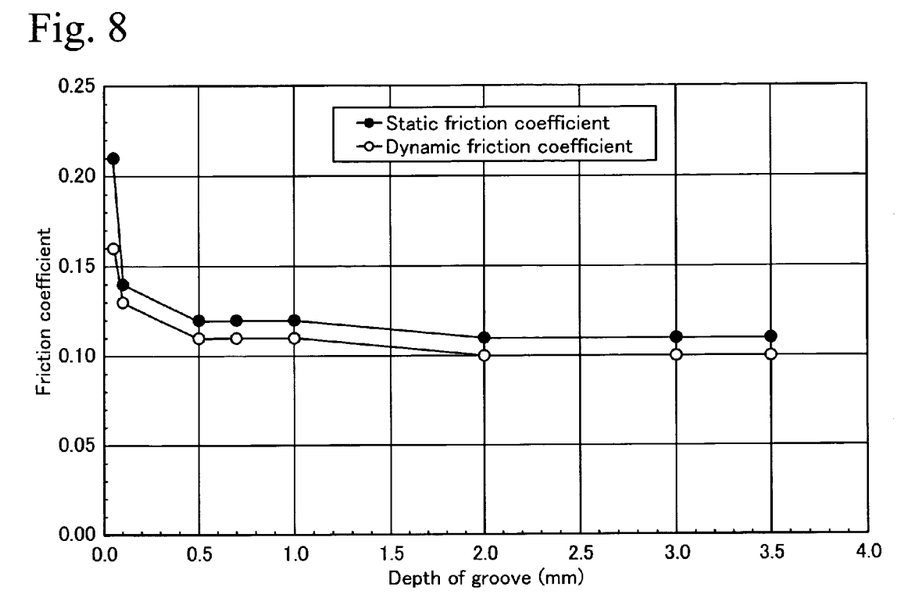
Figure 9:
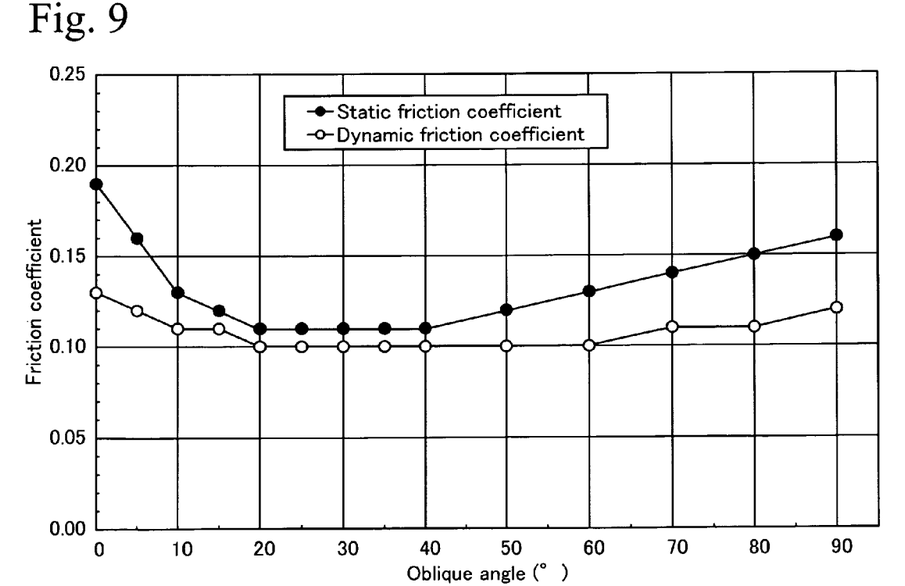

(5) Effect of the Oblique Angle of the Oblique Groove (See FIG. 8)

The bearings of the samples Nos. 20 and 41 to 53 shown in Table 2 were used to investigate the effect of the oblique angle of the oblique groove. In the bearings of the samples Nos. 41 and 42 having the oblique angle of the oblique groove of less than 10°, and the bearings of the samples Nos. 51 to 53 having the oblique angle of the oblique groove of more than 60°, the static friction coefficients and the dynamic friction coefficients were large. In contrast, in the bearings of the samples Nos. 21 and 43 to 50 having the oblique angle of the oblique groove in a range of 10° to 60°, the static friction coefficients and the dynamic friction coefficients were small. In the bearings of the samples Nos. 21 and 44 to 49 having the oblique angle of the oblique groove in a range of 15° to 50°, the static friction coefficients and the dynamic friction coefficients were smaller. In the bearings of the samples Nos. 21 and 45 to 48 having the oblique angle of the oblique groove in a range of 20° to 40°, the static friction coefficients and the dynamic friction coefficients were the smallest and were constant. Accordingly, the static friction coefficient and the dynamic friction coefficient are greatly decreased when the angle of the oblique groove is in a range of 10° to 60°. In addition, the angle of the oblique groove is preferably in a range of 15° to 60°, and the angle of the oblique groove is most preferably in a range of 20° to 40°.

INDUSTRIAL APPLICABILITY

The sliding bearing of the present invention is suitably used for large bearings that may be operated by swinging at a relatively small sliding rate while a surface pressure of at least 20 MPa is applied. Specifically, the sliding bearing of the present invention may be used for a joint bearing of a construction machine such as a bulldozer and a power shovel, a joint bearing of a robot for transferring articles, and the like.

The invention claimed is:

1. A sliding bearing comprising:
   a shaft hole for rotatably supporting a shaft that is inserted thereinto;
   an inner circumferential surface on which the shaft slides; and
   plural linearly oblique grooves extending in a single direction crossing a circumferential direction of the sliding bearing and formed on the inner circumferential surface at intervals, the grooves being adapted to be provided with a lubricant,
   wherein the oblique grooves have an oblique angle in a range of 10° to 40° with respect to a direction perpendicular to the circumferential direction and have a width B in a range of 0.5 to 5 mm in the circumferential direction,
   wherein the adjacent grooves have a land with a surface as a sliding surface therebetween, and the sliding surface has a width A in a range of 1 to 7 mm in the circumferential direction, and a ratio A/B of the width A of the sliding surface of the land to the width B of the groove is in a range of 0.5 to 5.0.

2. The sliding bearing according to claim 1, wherein the groove has a depth "d" in a range of 0.1 to 3 mm.

3. The sliding bearing according to claim 1, wherein the bearing is made of a sintered alloy.

4. The sliding bearing according to claim 1, wherein the sliding surface has a width A in a range of 2 to 5 mm in the circumferential direction.

5. The sliding bearing according to claim 1, wherein the ratio A/B of the width A of the sliding surface of the land to the width B of the groove is in a range of 1.46 to 4.05.

6. The sliding bearing according to claim 1, wherein the sliding bearing is used in surface pressure of at least 20 MPa.

7. The sliding bearing according to claim 1, wherein the sliding bearing is included in a joint bearing of a construction machine.

8. The sliding bearing according to claim 7, wherein the construction machine is one of a bulldozer and a power shovel.

9. The sliding bearing according to claim 1, wherein the sliding bearing is included in a joint bearing of a robot for transferring articles.

\* \* \* \* \*